United States Patent
Mayer et al.

(10) Patent No.: US 11,218,925 B2
(45) Date of Patent: Jan. 4, 2022

(54) DATA FORWARDING FOR INTER-RADIO ACCESS TECHNOLOGY WIRELESS NETWORKS

(71) Applicant: NOKIA TECHNOLOGIES OY, Espoo (FI)

(72) Inventors: Jürgen Mayer, Blaustein (DE); Krzysztof Maliga, Wroclaw (PL); Jean-Michel Pugeat, Paris (FR); Krzysztof Kordybach, Pulawy (PL)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/946,045

(22) Filed: Jun. 3, 2020

(65) Prior Publication Data
US 2021/0385704 A1    Dec. 9, 2021

(51) Int. Cl.
*H04W 76/12* (2018.01)
*H04W 36/00* (2009.01)
*H04W 76/15* (2018.01)
*H04W 76/30* (2018.01)
*H04W 76/11* (2018.01)
(Continued)

(52) U.S. Cl.
CPC ....... *H04W 36/0069* (2018.08); *H04L 1/1642* (2013.01); *H04W 76/11* (2018.02); *H04W 76/12* (2018.02); *H04W 76/15* (2018.02); *H04W 76/30* (2018.02); *H04W 84/18* (2013.01)

(58) Field of Classification Search
CPC . H04W 36/0069; H04W 76/15; H04W 76/30; H04W 76/11; H04W 76/12; H04W 84/18; H04L 1/1642
See application file for complete search history.

(56) References Cited

U.S. PATENT DOCUMENTS

2019/0045404 A1*  2/2019  Tsai ................. H04W 36/0022
2020/0205042 A1*  6/2020  Ryu ...................... H04W 76/10
(Continued)

OTHER PUBLICATIONS

3GPP TS 36.423 V16.1.0; 3rd Generation Partnership Project; Technical Specification Group Radio Access Network; Evolved Universal Terrestrial Radio Access Network (E-UTRAN); X2 application protocol (X2AP) (Release 16) Mar. 2020; Valbonne, France; 438 pages.

(Continued)

*Primary Examiner* — Lakeram Jangbahadur
(74) *Attorney, Agent, or Firm* — Brake Hughes Bellermann LLP

(57) ABSTRACT

A method may include receiving, by a secondary node of a third radio access technology (RAT) that is operating as a secondary node for an inter-radio access technology (inter-RAT) dual connectivity connection with a user device from a master node of a first RAT that is operating as a master node for the inter-RAT dual connectivity connection with the user device, a release request including a forward without sequence number indication that instructs the secondary node of the third RAT to forward, without sequence numbers, data for the dual connectivity connection to a target node of a second RAT, wherein the second RAT is different than the first RAT; and forwarding, by the secondary node of the third RAT towards the target node of the second RAT, via a data forwarding path that omits the master node of the first RAT, data without sequence numbers to the target node.

25 Claims, 9 Drawing Sheets

(51) Int. Cl.
*H04L 1/16* (2006.01)
*H04W 84/18* (2009.01)

(56) References Cited

U.S. PATENT DOCUMENTS

2020/0229056 A1* 7/2020 Liu .................... H04W 36/0011
2021/0014746 A1* 1/2021 Wu ..................... H04W 36/305

OTHER PUBLICATIONS

3GPP TS 36.300 V16.1.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16); Mar. 2020; Valbonne, France; 386 pages.
3GPP TS 37.340 V16.1.0; 3rd Generation Partnership Project; Technical Specification Group Radio Access Network; Evolved Universal Terrestrial Radio Access (E-UTRA) and NR; Multi-connectivity; Stage 2 (Release 16); Mar. 2020; Valbonne, France; 74 pages.
B. Bertenyi et al.; NG Radio Access Network (NG-RAN); Journal of ICT Standardization; vol. 6, Combined Special Issue 1 & 2; May 3, 2018; 18 pages.

* cited by examiner

Receiving, by a secondary node of a third radio access technology (RAT) that is operating as a secondary node for an inter-radio access technology (inter-RAT) dual connectivity connection with a user device from a master node of a first RAT that is operating as a master node for the inter-RAT dual connectivity connection with the user device, a release request including a forward without sequence number indication that instructs the secondary node of the third RAT to forward, without sequence numbers, data for the dual connectivity connection to a target node of a second RAT, wherein the second RAT is different than the first RAT — 410

Forwarding, by the secondary node of the second RAT towards the target node of the third RAT, via a data forwarding path that omits the master node of the first RAT, data without sequence numbers to the target node — 420

FIG. 4

DATA FORWARDING FOR INTER-RADIO ACCESS TECHNOLOGY WIRELESS NETWORKS

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include sending, by a master node of a first radio access technology (RAT) that is operating as a master node for an inter-radio access technology (inter-RAT) dual connectivity connection with a user device (or UE), a handover request to a target node of a second RAT to request a handover of the connection with the user device from the master node of the first RAT to the target node of the second RAT, wherein the second RAT is different than the first RAT; receiving, by the master node of the first RAT from the target node of the second RAT, a handover response; and sending, by the master node of the first RAT to a secondary node of a third RAT that is operating as a secondary node for the inter-RAT dual connectivity connection with the user device, a release request, including a forward without sequence number indication to instruct the secondary node of the third RAT to forward, without sequence numbers, data for the inter-RAT dual connectivity connection towards the target node of the second RAT.

According to another example embodiment, a method may include receiving, by a secondary node of a third radio access technology (RAT) that is operating as a secondary node for an inter-radio access technology (inter-RAT) dual connectivity connection with a user device from a master node of a first RAT that is operating as a master node for the inter-RAT dual connectivity connection with the user device, a release request including a forward without sequence number indication that instructs the secondary node of the third RAT to forward, without sequence numbers, data for the dual connectivity connection to a target node of a second RAT, wherein the second RAT is different than the first RAT; and forwarding, by the secondary node of the third RAT towards the target node of the second RAT, via a data forwarding path that omits the master node of the first RAT, data without sequence numbers to the target node.

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

BRIEF DESCRIPTION OF THE DRAWINGS

FIG. 4 is a flow chart illustrating operation of a secondary node according to an example embodiment.

DETAILED DESCRIPTION

Figure 1:
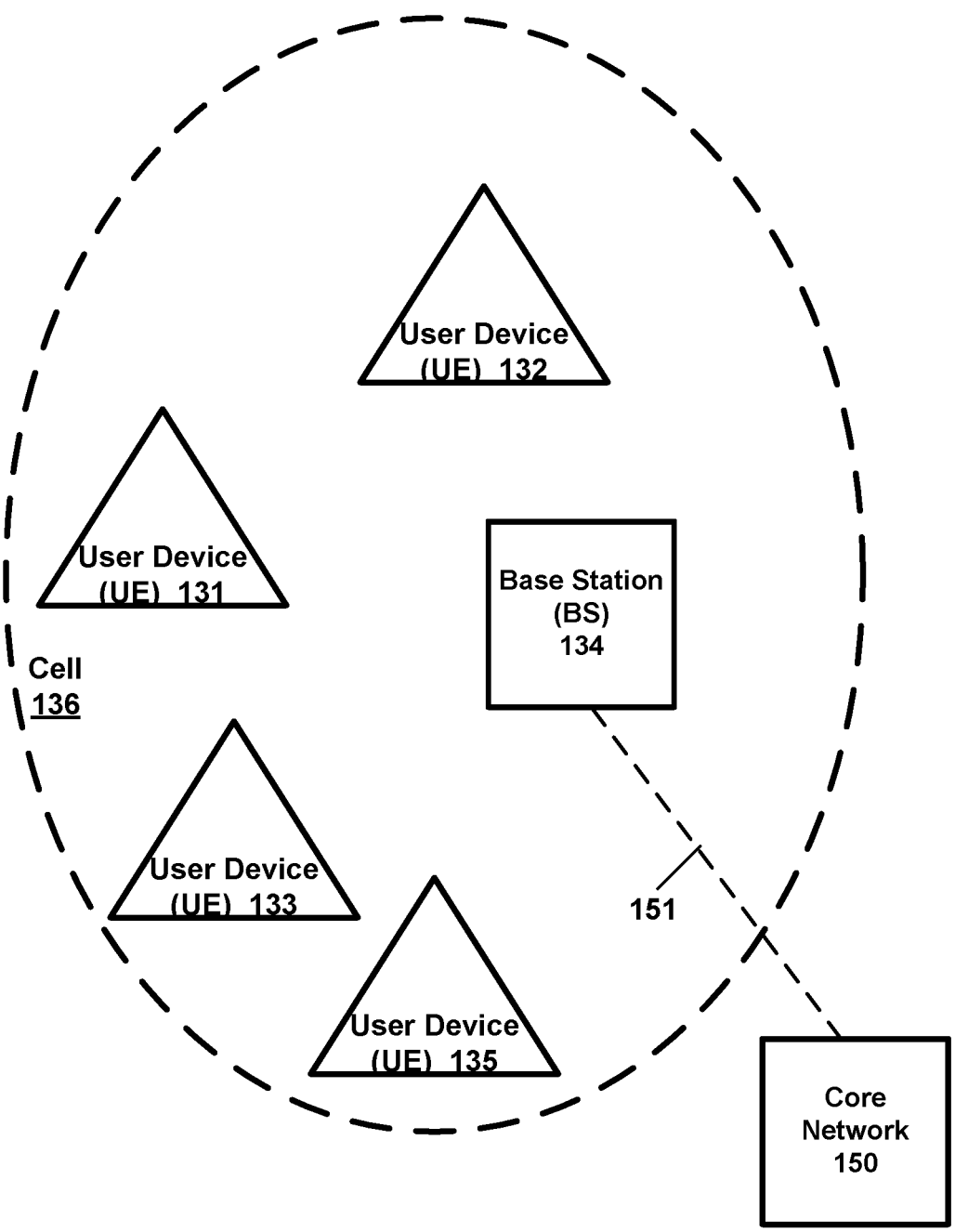
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)-related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

A UE (or user device) may be configured to communicate with nodes or network nodes of one or more different radio access technologies (RATs). A radio access technology (RAT) may be defined by a unique set of protocols (or protocol entities) that may define the operation of UEs or network nodes of that RAT. Different RATs may have different protocol entities. Thus, different RATs may include, for example, LTE, New Radio (5G), IEEE 802.11/WiFi, and others.

Dual connectivity may refer to where a UE (or user device) may simultaneously have a connection established with each of multiple network nodes (e.g., where a network node may include, for example, a LTE eNB, a NR/5G gNB, an IEEE 802.11/WiFi Access Point, a base station or other network node). Thus, dual connectivity may refer to two simultaneous connections for a UE, e.g., a first connection to a first network node, and a second connection to a second network node. Inter-RAT dual connectivity may refer to where a UE may have a simultaneous connection established to a network node of each of two (or multiple) RATs. Thus, an example of an inter-RAT dual connectivity may include where a UE has established a first connection with a LTE eNB and a second connection with a NR/5G gNB. In some examples of dual connectivity, one of the network nodes may operate as a master node, and the other network node may operate as a secondary node, e.g., where the master node may control one or more aspects of the operation of the secondary node, as an example. For example, the master node may control the addition to and/or release of the secondary node as part of the dual connectivity for the UE, and/or may control what data is transmitted to/from the secondary node or scheduling of data transmission by the secondary node, or other aspects of the secondary node. One example of dual connectivity may include EUTRAN (LTE)-New Radio (NR/5G)-dual connectivity (EN-DC), which may involve a UE connected to both a LTE network node (a LTE eNB) and a NR/5G network node (a NR/5G gNB).

A handover of a user equipment (UE) may refer to a process in which a connected call or a data session for the UE is transferred from one cell (or one network node) to another cell (or another network node or BS) without disconnecting the session. For example, when a target cell/target network node becomes better (e.g., greater reference signal received power (RSRP)) than a source cell/source network node by at least a threshold, then the UE may perform (or may be requested to perform) a handover to the target cell. In some cases, an inter-RAT handover may be performed, e.g., in which the UE may perform a handover from a source cell of a first RAT to a target cell of a second RAT. For example, an inter-RAT handover may involve a handover of a UE from a source eNB to a target gNB, or may involve a handover of the UE from a source gNB to a target eNB, as examples. During, or as part of, the handover of the UE from the source node to the target node, unacknowledged data (e.g., downlink data that has not been acknowledged by the UE as received by the UE yet) may be forwarded by the source node to the target node, to allow this data to be delivered by the target node to the UE after the UE has performed the handover to the target node.

However, incompatibilities (and/or a lack of inter-operability) may sometimes arise for a UE for multiple RATs, such as for an inter-RAT dual connectivity and/or for an inter-RAT handover for a UE/user device.

As an illustrative example, in LTE with EN-DC option 3×, the Packet Data Convergence Protocol (PDCP) entity of an SCG split bearer is located in the en-gNB (of 5G NSA). EN-DC (EUTRA/LTE New Radio-Dual Connectivity) provides a UE with dual connectivity between LTE and 5G Non standalone mode where master node is on LTE side (Master eNB/MeNB); and secondary node is 5G gNB (or secondary gNB or SgNB). For example, option 3× provides a slight variant, e.g., in which User plane (data) PDCP entity for split bearer is located on secondary EN-gNB (SgNB).

However, in some LTE-NR/5G dual connectivity arrangements, the standards or specifications may be in conflict or may be incompatible in one or more aspects. For example, for the EN-DC arrangement, in case of a handover (HO) of a UE from LTE (Master eNB) to 5G Standalone (target gNB), the eNodeB (MeNB that operates as the source node) will initiate "MeNB initiated SgNB Release" according to TS36.423 section 8.7.9. The SgNB release request sent by the master node (MeNB) to secondary node (SgNB) instructs the secondary node (SgNB) (of the dual connectivity with UE) to release its connection with the UE, to allow a handover of the UE to proceed from master node (MeNB) to target node (target gNB): "If the bearer context in the en-gNB was configured with the PDCP entity in the en-gNB, for E-RAB [radio access bearer] for which the MeNB requests forwarding of uplink/downlink data, the MeNB includes the UL Forwarding GTP Tunnel Endpoint/DL Forwarding GTP Tunnel Endpoint IE within the E-RABs To Be Released Item IE of the SGNB RELEASE REQUEST message to indicate that the en-gNB should perform data forwarding of uplink/downlink packets for that E-RAB." This requests the en-gNB (SgNB) to forward unacknowledged PDCP (packet data control protocol) service data units (SDUs) via a provided tunnel endpoint identifier (or address), such as via a GPRS Tunneling Protocol (GTP) tunnel endpoint identifier (GTP-TEID). According to TS (technical specification) 37.340 (section 8.4), the en-gNB shall apply data forwarding as defined for "source eNB" for handover. This implies that en-gNB (secondary gNB/SgNB) shall forward "downlink PDCP SDUs with their SN (sequence numbers)" (TS36.300 section 10.1.2.3.1). On the other hand 3GPP TS36.300 section 10.2.2a specifies for data forwarding during Inter RAT handover that: "Any assigned PDCP SNs are not forwarded because of PDCP reset." As consequence the source side en-gNB (secondary gNB/SgNB), which has been requested to release its connection to UE and forward data, will forward PDCP SDUs/data with sequence numbers (SNs) assigned, while the target gNB will expect forwarded PDCP data (forwarded SDUs) to be received by target gNB without sequence numbers (SNs). Thus, a contradiction or inconsistency in data forwarding operation exists for the forwarding of data from a secondary gNB (SgNB, such as an en-gNB) as part of EN-DC, to a target gNB, as the secondary gNB (forwarding the data in response to a release request) is expected to forward data with sequence numbers (SNs), while the target gNB will be expecting the forwarded data that it receives from SgNB will not include sequence numbers (SNs).

Figure 2:
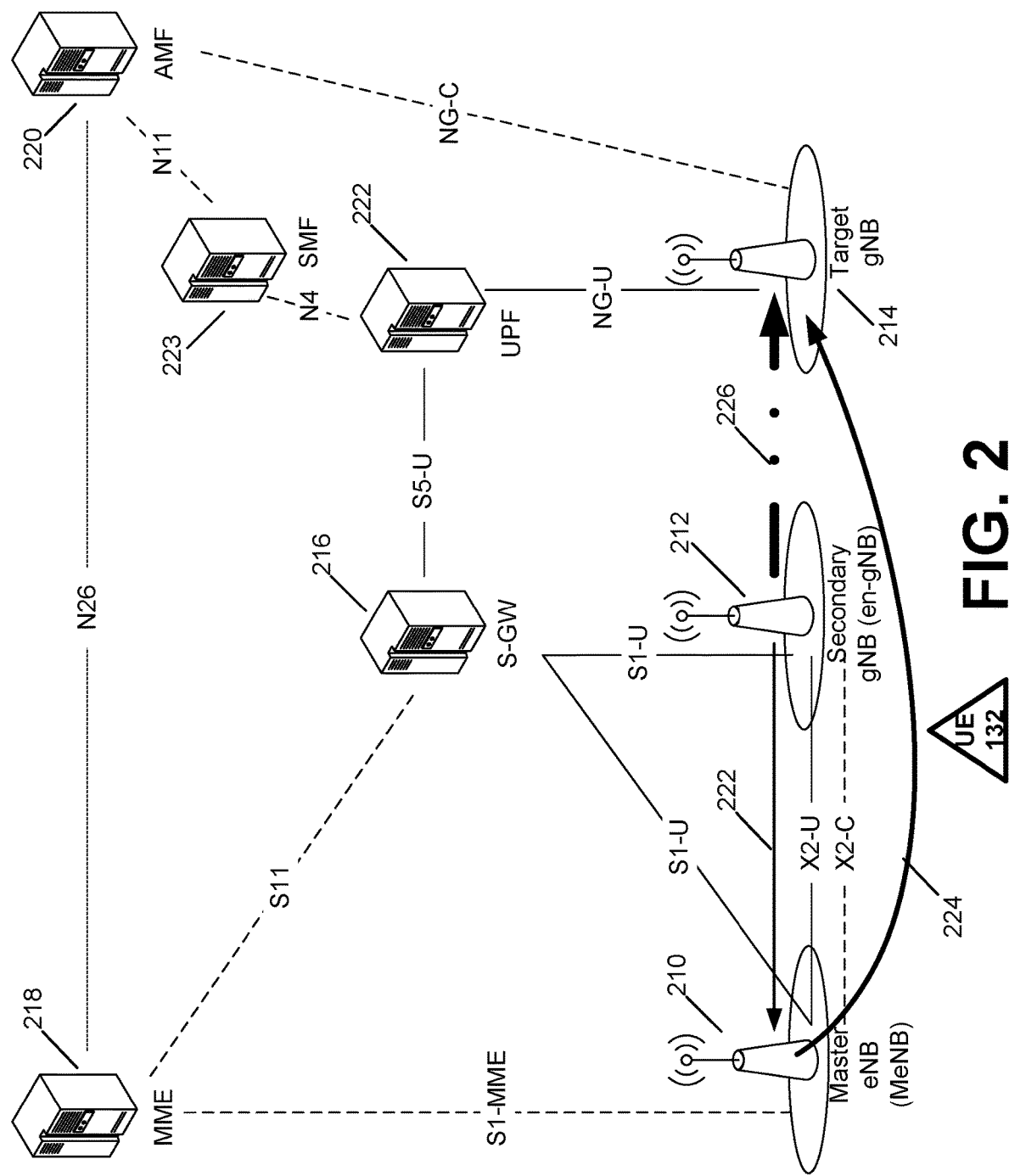
FIG. 2 is a block diagram of a system that illustrates data forwarding according to an example embodiment.

FIG. 2 is a block diagram of a system that illustrates data forwarding according to an example embodiment. Initially, a dual connectivity is provided for a UE 132, including a first connection for the UE 132 with a (LTE) master eNB (MeNB) 210, and a second connection with a (NR/5G) secondary gNB (SgNB) 212. The SgNB 212 in this example may be a en-gNB (EUTRA-New Radio/5G gNodeB) that is configured to operate as a secondary gNB (SgNB) for a LTE-New Radio (5G) dual connectivity (EN-DC) with the UE 132, in which the eNB (MeNB) 210 operates as the master node, and the en-gNB (SgNB) 212 operates as the secondary node for dual connectivity (DC) with the UE. This is an illustrative example, and other types of primary nodes and secondary nodes and/or other configurations, may be used, including for different RATs than shown in FIG. 2.

Referring to FIG. 2, master eNB (MeNB) 210 may be connected to the LTE core network, including being connected (via S1-MME interface) to the LTE Mobility Management Entity (MME) 218. MME 218 may be a control node in the LTE access network, and may perform mobility management and radio resource management. The Serving Gateway (S-GW) may be provided for one or both LTE and/or 5G/NR core networks, and may provide data forwarding and routing, for example.

The secondary gNB (SgNB) 212 and a target gNB 214 may be connected to one or more core network nodes of the NR/5G core network, e.g., including a connection to one or more of a Serving Gateway (S-GW) 216 that performs routing and forwarding of data and assists with handovers, a User Plane Function (UPF) 222 that supports packet routing and forwarding, and acts as an anchor point for intra and inter-RAT mobility/handover, a Session Management Function (SMF) 223 that supports session establishment, session modification and/or session release, and/or an Access and Mobility Management Function (AMF) 220 that provides ciphering and integrity protection, registration management, connection management access authentication.

At some point, e.g., based on movement of the UE 132 away from MeNB 210 and/or movement of the UE 132 towards target gNB 214, a handover may be initiated or performed for the UE from the MeNB 210 (and the SgNB 212, since the dual connectivity connection with the UE may be released as part of the UE handover) to target gNB 214. As part of the UE handover, the secondary node (SgNB 212) may forward unacknowledged UE data to the target gNB 214. However, as noted above, an inter-RAT interoperability issue may arise where the SgNB 212 will typically forward UE data with sequence numbers, but the target gNB 214 will typically be expecting the forwarded data to omit (or not include) sequence numbers. To summarize this issue:

As noted above, for a handover scenario of a UE from LTE (e.g., from MeNB 210) to 5G Standalone (e.g., to target gNB 214), contradictory descriptions exist in the standard(s):
  3GPP TS36.423, section 8.7.9: en-gNB shall forward not acknowledged PDCP SDU via provided GTP-TEID.
  3GPP TS37.340, section 8.4 en-gNB shall forward "downlink PDCP SDUs with their SN".
  3GPP TS36.300 section 10.2.2a: Any assigned PDCP SNs are not forwarded because of PDCP reset.

As consequence, the source side en-gNB (en-gNB or SgNB 212) currently will forward PDCP data (SDUs) with sequence numbers (SNs) assigned to each packet or SDU, while the target gNB currently expects to receive forwarded PDCP data (packets or SDUs) without SNs. Thus, currently, the SgNB 212 typically forwards data with sequence numbers to the MeNB 210 via line 224. Typically, the MeNB 210 strips off (or removes) sequence numbers for the data, and then forwards the data (without sequence numbers) towards the target gNB 214. However, this process of forwarding data via the MeNB 210 adds significant forwarding latency, and may create significant processing overhead at the MeNB 210.

Therefore, a technical improvement is provided in which, as part of the UE handover process, a master node (e.g., MeNB 210) may send a release request (e.g., SgNB release request) to a secondary node (e.g., en-gNB or SgNB 212) that instructs the secondary node to release its connection with the UE, and the release request includes a forward without sequence number indication (e.g., which may be provided as a flag, a parameter or other information that may be provided to the secondary node (e.g., en-gNB or SgNB 212)). The forward without sequence number indication (e.g., included with, or transmitted with the release request) instructs the secondary node (e.g., SgNB 212) to forward UE data (e.g., UE data for the inter-RAT dual connectivity connection for the UE 132) without sequence numbers to (or towards) the target node (e.g., towards target gNB 214). For example, in response to receiving the release request (e.g., SgNB release request from MeNB 210), the secondary node (e.g., SgNB 212) may remove or strip off sequence numbers from UE data (SDUs, PDUs or packets for the UE) and then forward the UE data, without sequence numbers, towards the target node (towards the target gNB 214) via a data forwarding path that omits (or avoids) the master node (e.g., omits the MeNB 210 from the data forwarding path to the target node). Thus, as shown by line 226, data may be forwarded (e.g., indicated by line 226) by secondary node (e.g., SgNB 212) to the target node (e.g., target gNB 214) via a data forwarding path that omits or avoids MeNB 210. For example, the secondary node may forward data towards the target node based on a tunnel identifier that is associated with the target node (or that may be associated with a core network node along a data forwarding path towards the target node). Further data forwarding path examples, which also omit the master node, are illustrated and described below with respect to FIGS. 5-8.

Thus, in this manner, by the secondary node (e.g., SgNB 212) receiving a forward without sequence number indication, e.g., via a received release request that includes a forward without sequence number indication (e.g., instructing the secondary node to forward the data to or towards the target node without sequence numbers), this causes the secondary node (e.g., SgNB 212) to forward the UE data, without sequence numbers, to the target node (e.g., target gNB 214). Also, the MeNB hop may be omitted from the data forwarding path, e.g., data may be forwarded by SgNB 212 to or towards target gNB 214 via a data forwarding path that omits the master node (e.g., MeNB 210). By providing a forward without sequence number indication to the secondary node, this allows both the secondary node and the target node to have a consistent technique of forwarding data without sequence numbers (e.g., allowing for improved inter-operability between different network nodes, or network nodes of different RATs, since both the forwarding secondary node and the receiving target node will use data forwarding without sequence numbers). Thus, inter-operability is improved. Also, for example, by forwarding the data via a data forwarding path that omits the master node (e.g., MeNB 210), this may reduce data forwarding latency (since the forwarding to and from MeNB 210 is omitted, thus reducing the data forwarding path by 1 hop in this example) and reduce the processing load on the master node (e.g., on MeNB 210 in this illustrative example).

Figure 3:
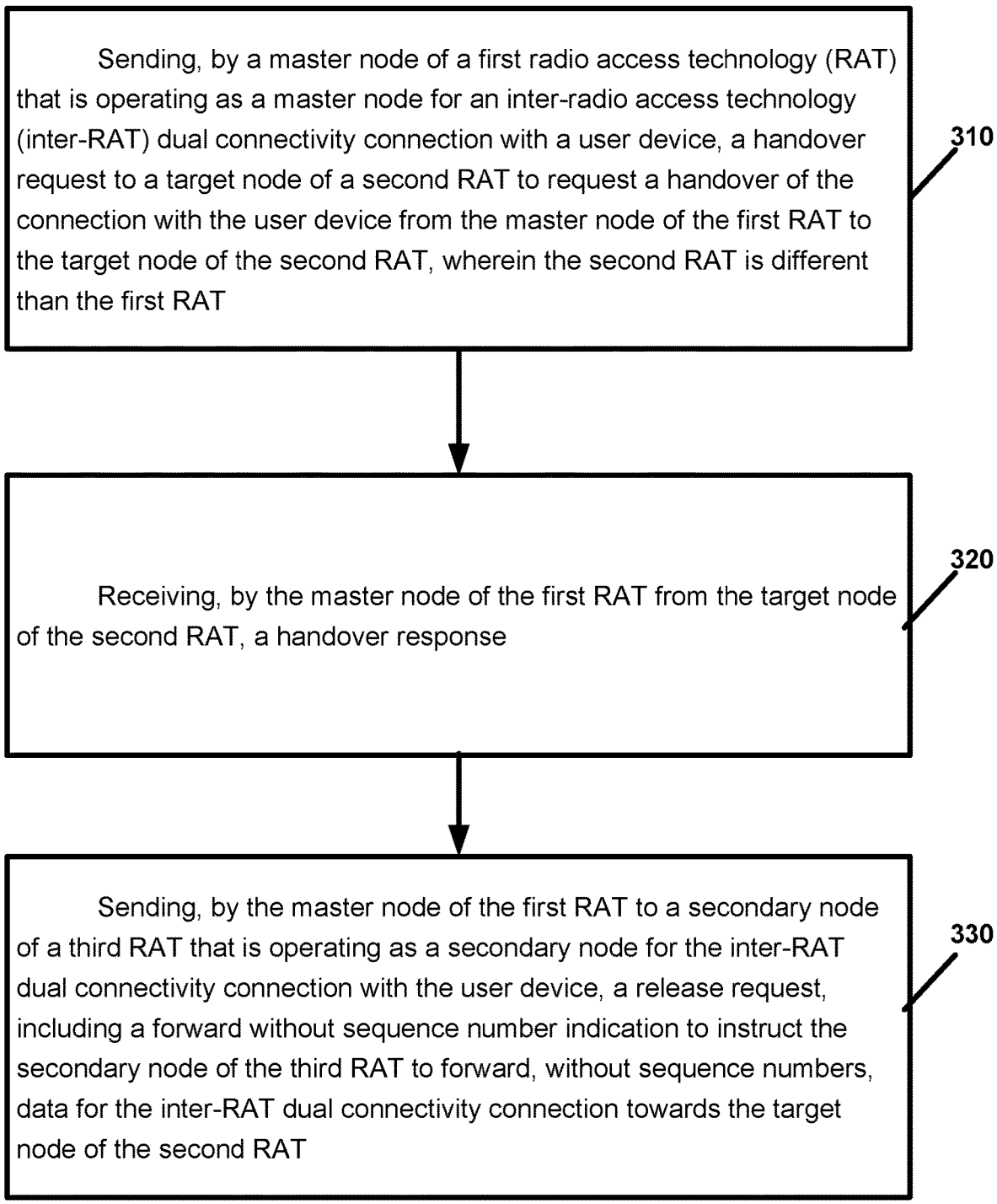
FIG. 3 is a flow chart illustrating operation of a master node according an example embodiment.

FIG. 3 is a flow chart illustrating operation of a master node according an example embodiment. FIG. 4 is a flow chart illustrating operation of a secondary node according to an example embodiment. With respect to the examples of FIGS. 3-4, an inter-RAT dual connectivity connection may have been established for a UE, e.g., which may include a first connection between the UE and a master node of a first RAT (first radio access technology), and a second connection between the UE and a secondary node of a third RAT, as part of an inter-RAT dual connectivity connection with the UE. A handover may be triggered for the UE to cause a handover of the UE from the master node of the first RAT (and the secondary node of the third RAT) to the target node of the second RAT. For example, the first and second RATs may be different RATs, and the second and third RATs may be the same RAT (e.g., NR/5G). Or, all three RATs may be different. As an illustrative example, the first RAT may be LTE, and the master node may be a MeNB. The second and third RATs may be NR/5G, and the secondary node may be a secondary gNB (SgNB), while the target node may be a target gNB. For example, with reference to the flow chart of FIG. 3 and/or FIG. 4, the master node may be MeNB 210 (FIG. 2), the secondary node may be the secondary gNB (en-gNB) 212 (FIG. 2), and the target node may be target gNB 214 (FIG. 2). Other RATs and/or nodes may be used as well.

Referring to FIG. 3, operation 310 includes sending, by a master node of a first radio access technology (RAT) that is operating as a master node for an inter-radio access technology (inter-RAT) dual connectivity connection with a user device, a handover request to a target node of a second RAT to request a handover of the connection with the user device from the master node of the first RAT to the target node of the second RAT, wherein the second RAT is different than the first RAT. Operation 320 includes receiving, by the master node of the first RAT from the target node of the second RAT, a handover response. And, operation 330 includes sending, by the master node of the first RAT to a secondary node of a third RAT that is operating as a secondary node for the inter-RAT dual connectivity connection with the user device, a release request, including a forward without sequence number indication to instruct the secondary node of the third RAT to forward, without sequence numbers, data for the inter-RAT dual connectivity connection towards the target node of the second RAT.

With respect to the method of FIG. 3, the first radio access technology (RAT) may be LTE; wherein the second radio access technology (RAT) and the third radio access technology (RAT) comprises New Radio (NR) or 5G.

With respect to the method of FIG. 3, the sending a handover request may include sending, by a master node of a first radio access technology (RAT) that is operating as a master node for an inter-radio access technology (inter-RAT) dual connectivity connection with a user device, a handover request to a target node of a second RAT to request a handover of the connection with the user device from the master node of the first RAT to the target node of the second RAT, wherein the second RAT is different than the first RAT; the receiving may include receiving, by the master node of the first RAT from the target node of the second RAT, a handover response including a tunnel endpoint identifier (e.g., the tunnel endpoint identifier may be associated with, e.g., provide an address of or for, the target node, or the tunnel endpoint identifier may be associated with (e.g., provide an address of or for) a core network node that is along a data forwarding path between the secondary node and the target node); and the sending a release request may include sending, by the master node of the first RAT to a secondary node of a third RAT that is operating as a secondary node for the inter-RAT dual connectivity connection with the user device, a release request, including the tunnel endpoint identifier and a forward without sequence number indication to instruct the secondary node of the third RAT to forward, without sequence numbers, data for the inter-RAT dual connectivity connection towards the target node of the second RAT based on the tunnel endpoint identifier. Thus, with respect to the method of FIG. 3, for example, the tunnel endpoint identifier may be either associated with the target node of the second RAT or associated with a core network node in a data forwarding path from the secondary node to the target node.

With respect to the method of FIG. 3, the sending a handover request may include sending, by a master eNB that is operating as a master node for an inter-radio access technology (inter-RAT) dual connectivity connection with a user device, a handover request to a target gNB to request a handover of the connection with the user device from the master eNB to the target gNB; the receiving may include receiving, by the master eNB from the target gNB, a handover response including a tunnel endpoint identifier; and the sending a release request may include sending, by the master eNB to a secondary gNB that is operating as a secondary node for the inter-RAT dual connectivity connection with the user device, a release request, including the tunnel endpoint identifier associated with the target gNB (or associated with a core network node along the data forwarding path to the target gNB) and a forward without sequence number indication to instruct the secondary gNB to forward, without sequence numbers, data for the dual connectivity connection to the target gNB based on the tunnel endpoint identifier.

With respect to the method of FIG. 3, further including receiving, by the master eNB from the secondary gNB, a release request acknowledge (e.g., in response to sending the release request).

With respect to the method of FIG. 3, the tunnel endpoint identifier may include a GPRS Tunneling Protocol tunnel endpoint identifier (GTP-TEID) that is either associated with the target gNB or associated with a core network node in a data forwarding path from the secondary gNB to the target gNB.

With respect to the method of FIG. 3, the secondary gNB may include a gNB that is configured to operate as a secondary gNB for a LTE-New Radio (5G) dual connectivity connection with the user device. Or, the secondary gNB may include a LTE-New Radio gNB or a EUTRA-New Radio gNB (en-gNB) that is configured to operate as a secondary gNB for a LTE-New Radio (5G) dual connectivity connection with the user device.

With respect to the method of FIG. 3, the release request may include a secondary gNB (SgNB) release request, indicating a GPRS Tunneling Protocol tunnel endpoint identifier (GTP-TEID) that is either associated with the target gNB or associated with a core network node in a data forwarding path from the secondary gNB to the target gNB.

FIG. 4 is a flow chart illustrating operation of a secondary node according to an example embodiment. Operation 410 includes receiving, by a secondary node of a third radio access technology (RAT) that is operating as a secondary node for an inter-radio access technology (inter-RAT) dual connectivity connection with a user device from a master node of a first RAT that is operating as a master node for the inter-RAT dual connectivity connection with the user device, a release request including a forward without sequence number indication that instructs the secondary node of the third RAT to forward, without sequence numbers, data for the dual connectivity connection to a target node of a second RAT, wherein the second RAT is different than the first RAT. And, operation 420 includes forwarding, by the secondary node of the third RAT towards the target node of the second RAT, via a data forwarding path that omits the master node of the first RAT, data without sequence numbers to the target node.

The method of FIG. 4 may further include removing, by the secondary node of the third RAT, sequence numbers from the data for the dual connectivity connection before forwarding the data towards the target node. For example, the first radio access technology (RAT), the second RAT, and the third RAT may be different RATs. Or the first radio access technology (RAT) (e.g., LTE) may be different than the second RAT and the third RAT; and wherein the second RAT and the third RAT are the same RAT (e.g., 5G/NR). For example, with reference to the flow chart of FIG. 4, the master node may be MeNB 210 (FIG. 2), the secondary node may be the secondary gNB (en-gNB) 212 (FIG. 2), and the target node may be target gNB 214 (FIG. 2). Other RATs and/or nodes may be used as well. With respect to the method of FIG. 4, the first radio access technology (RAT) may be LTE; wherein the second radio access technology (RAT) and the third radio access technology (RAT) comprises New Radio (NR) or 5G, as an example.

With respect to the method of FIG. 4, wherein the receiving comprises receiving, by a secondary node of a third radio access technology (RAT) that is operating as a secondary node for an inter-radio access technology (inter-RAT) dual connectivity connection with a user device from a master node of a first RAT that is operating as a master node for the inter-RAT dual connectivity connection with the user device, a release request including a tunnel endpoint identifier and a forward without sequence number indication that instructs the secondary node of the third RAT to forward, without sequence numbers, data for the dual connectivity connection towards the target node of the second RAT based on the tunnel endpoint identifier, wherein the second RAT is different than the first RAT; and wherein the forwarding comprises forwarding, by the secondary node of the third RAT towards the target node of the second RAT, via a data forwarding path that omits the master node of the first RAT, data without sequence numbers to the target node based on the tunnel endpoint identifier, wherein the tunnel endpoint identifier is either associated with the target node of the second RAT or associated with a core network node in the data forwarding path from the secondary node to the target node.

With respect to the method of FIG. 4, the tunnel endpoint identifier comprises a GPRS Tunneling Protocol tunnel endpoint identifier (GTP-TEID) that is either associated with the target node of the second RAT or associated with a core network node in a data forwarding path from the secondary node to the target node.

With respect to the method of FIG. 4, the receiving may include receiving, by a secondary gNB that is operating as a secondary node for an inter-radio access technology (inter-RAT) dual connectivity connection with a user device from a master eNB that is operating as a master node for the inter-RAT dual connectivity connection with the user device, a release request, including a tunnel endpoint identifier and a forward without sequence number indication that instructs the secondary gNB to forward, without sequence numbers, data for the dual connectivity connection to the target gNB based on the tunnel endpoint identifier; and wherein the forwarding comprises forwarding, by the secondary gNB towards the target gNB via a data forwarding path that omits the master eNB, data without sequence numbers to the target gNB based on the tunnel endpoint identifier.

With respect to the method of FIG. 4, the tunnel endpoint identifier is either associated with the target gNB or associated with a core network node in a data forwarding path from the secondary gNB to the target gNB. Also, for example, the forwarding to the target node may be performed either directly to the target gNB, or via one or more core network nodes (e.g., a data forwarding path that includes one or more core network nodes between the secondary node and the target node), while omitting the master eNB from the data forwarding path.

With respect to the method of FIG. 4, the secondary gNB may include a LTE-New Radio gNB or a EUTRA-New Radio gNB (en-gNB) that is configured to operate as a secondary gNB for a LTE-New Radio (5G) dual connectivity connection with the user device.

Figure 5:
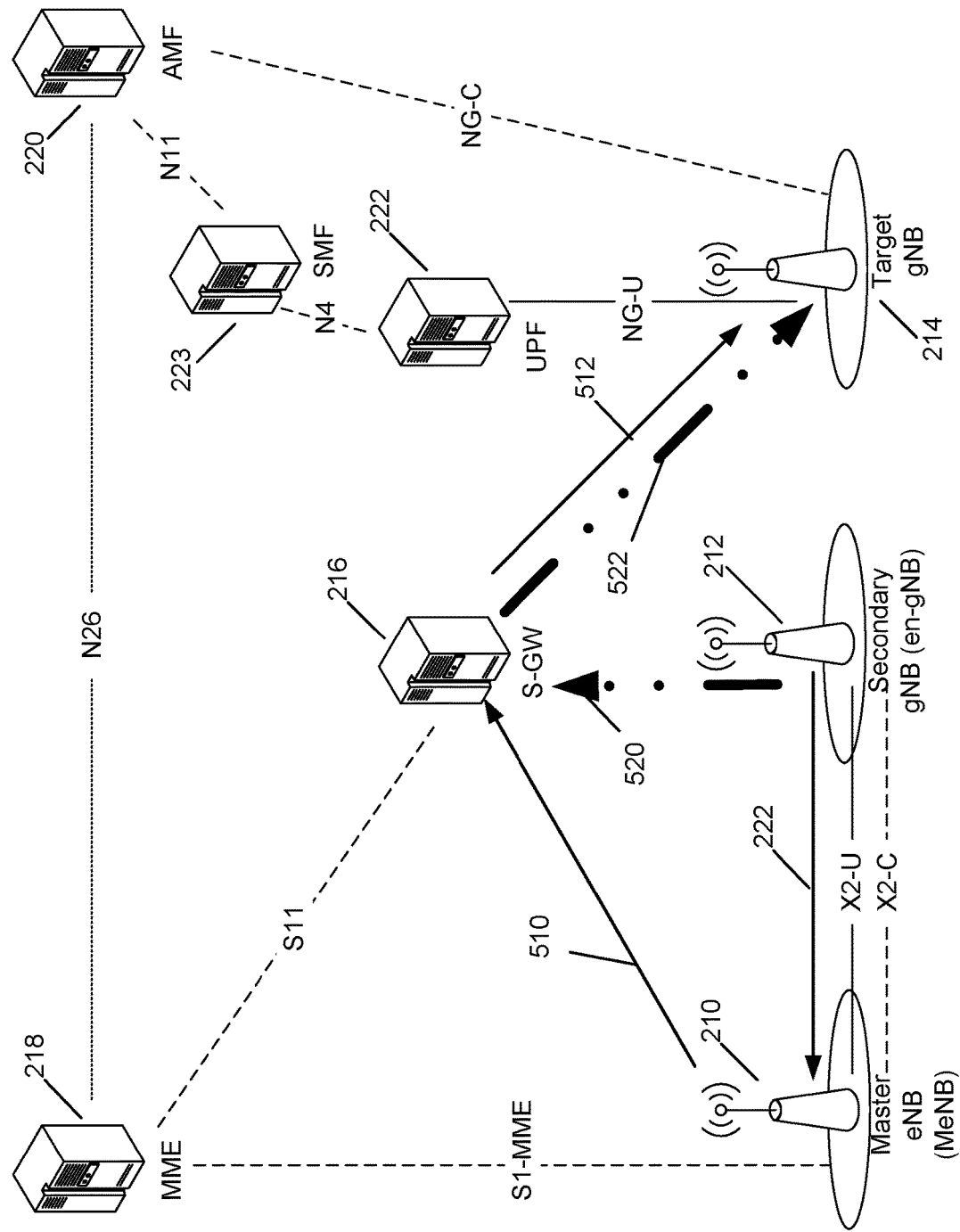
FIGS. 5-7 are block diagrams of systems that illustrate data forwarding according to other example embodiments.
Figure 6:
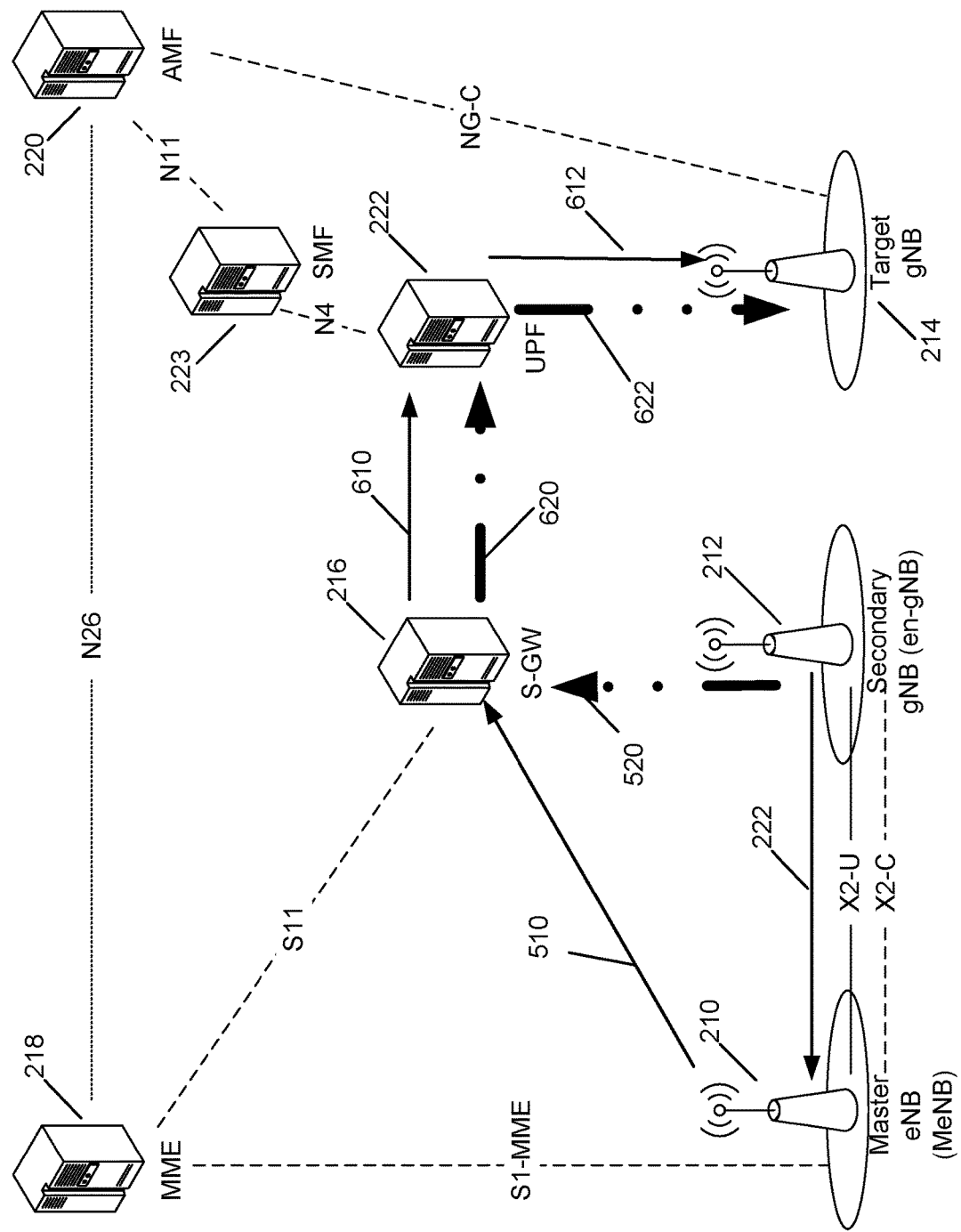
Figure 7:
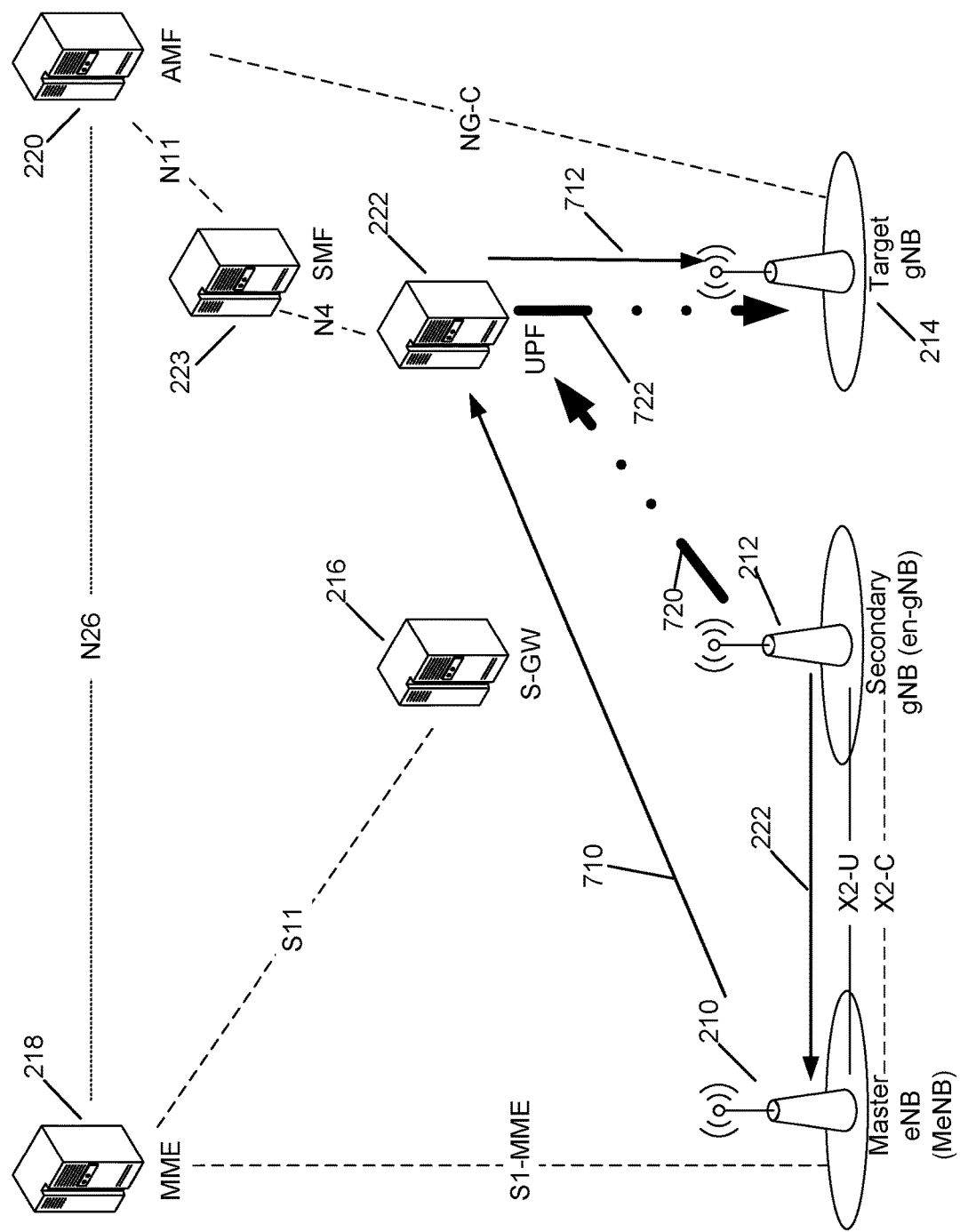

FIGS. 5-7 are block diagrams of systems that illustrate data forwarding according to other example embodiments. In FIG. 5, SgNB 212 would typically have forwarded data to target gNB 214 via a data forwarding path that include line 222 from SgNB 212 to MeNB 210, line 510 from MeNB 210 to S-GW 216, and line 512 from S-GW 216 to target gNB 214. However, in an example embodiment, based on the forwarding without sequence number indication received by the SgNB 212, the SgNB 212 may strip off or remove sequence numbers (SNs) from the data (SDUs or PDUs), and then forward the data towards target gNB 214 via a data forwarding path (including lines 520 and 522) that omits MeNB 210. For example, the SgNB 212 may receive a SgNB release request that may include the forward without sequence number indication and a tunnel identifier associated with either the target node (e.g., target gNB 214) or associated with a node (e.g., a core network node) along the data forwarding path from the secondary node (SgNB 212) to the target node (target gNB 214). Thus, in this illustrative example shown in FIG. 5, the tunnel identifier received by SgNB (e.g., with the release request) may be associated with S-GW 216. Thus, the SgNB 212 may forward the data, without SNs, towards target gNB 214, based on a tunnel identifier associated with the S-GW 216 (for a first tunnel from SgNB 212 to S-GW 216), which causes the data to be forwarded first to S-GW 216. Then, S-GW 216 may forward the data to target gNB 214, based on a tunnel identifier (stored by or known by S-GW 216) associated with target gNB 214 (for a second tunnel from S-GW 216 to target gNB 214). The first tunnel and the second tunnel may be associated with each other, which may allow the S-GW to forward the data received via the first tunnel of line 520, to target gNB 214 via the second tunnel of line 522. Thus, in the example of FIG. 5, the data forwarding path, that omits MeNB 210, includes a path from SgNB 212 to S-GW 216 (via line 520), and from S-GW 216 to target gNB 214 (via line 522). The data forwarding path (including lines 520 and 522) that omits the master node (e.g., MeNB 210) is merely one of many possible data forwarding paths that may be used, and/or which may omit MeNB 210. Any number of hops or nodes (e.g., core network nodes) may be part of the data forwarding path from the SgNB 212 to the target gNB 214, although it may be advantageous to omit the master node (MeNB 210) from the data forwarding path.

Similarly, in FIG. 6, SgNB 212 would typically have forwarded data to target gNB 214 via a data forwarding path that includes line 222 from SgNB 212 to MeNB 210, line 510 from MeNB 210 to S-GW 216, line 610 from S-GW 216 to UPF 222, and line 612 from UPF to target gNB 214. However, in an example embodiment, based on the forwarding without sequence number indication received by the SgNB 212 and a tunnel endpoint identifier or other address received by the secondary node (SgNB 212), the SgNB 212 may strip off or remove sequence numbers (SNs) from the data (SDUs or PDUs), and then forward the data towards target gNB 214 via a data forwarding path (including lines 520, 620 and 622) that omits MeNB 210. For example, the SgNB 212 may receive a SgNB release request that may include the forward without sequence number indication and a tunnel identifier associated with a next hop or node in the data forwarding path, which may be either the target node (e.g., target gNB 214) or a node (e.g., a core network node)

along the data forwarding path from the secondary node (SgNB 212) to the target node (target gNB 214). Thus, in this illustrative example shown in FIG. 6, the tunnel identifier received by SgNB 212 (e.g., with the release request) may be associated with S-GW 216 (for a first tunnel for line 520). The tunnel identifier received by the SgNB 212 may be the address of or tunnel identifier associated with a next hop of the data forwarding path. Thus, the SgNB 212 may forward the data, without SNs, towards target gNB 214, based on a tunnel identifier associated with the S-GW 216 (for a first tunnel from SgNB 212 to S-GW 216, via line 520), which causes the data to be forwarded first to S-GW 216. Then, S-GW 216 may forward the data to UPF 222, based on a tunnel identifier (stored or known by S-GW 216) associated with UPF 222, for a second tunnel via line 620. UPF 222, based on a third tunnel, may then forward the data to target gNB via line 622, based on a tunnel identifier associated with target gNB 214. The tunnels may be associated with each other (as known by S-GW 216 and UPF 222). Thus, in the example of FIG. 6, the data forwarding path, that omits MeNB 210, includes a path from SgNB 212 to S-GW 216 (via line 520), from S-GW 216 to UPF 222 (via line 620), and from S-GW 216 to target gNB 214 (via line 622).

Similarly, in FIG. 7, the SgNB may typically or previously have forwarded data via line 222 from SgNB 212 to MeNB 210, line 710 from MeNB 210 to UPF 222, and via line 712 from UPF 222 to target gNB 214. However, in this example embodiment, the secondary node (SgNB 212) may forward data to the target node via a data forwarding path that may omit the master node (MeNB 210), including via line 720 from SgNB to UPF 222, and via line 722 from UPF 222 to target gNB 214. These are several examples of data forwarding and/or data forwarding paths that may be used, but other data forwarding paths may be used, e.g., which may include hops at or to SMF, AMF, and/or other node or core network nodes.

Figure 8:
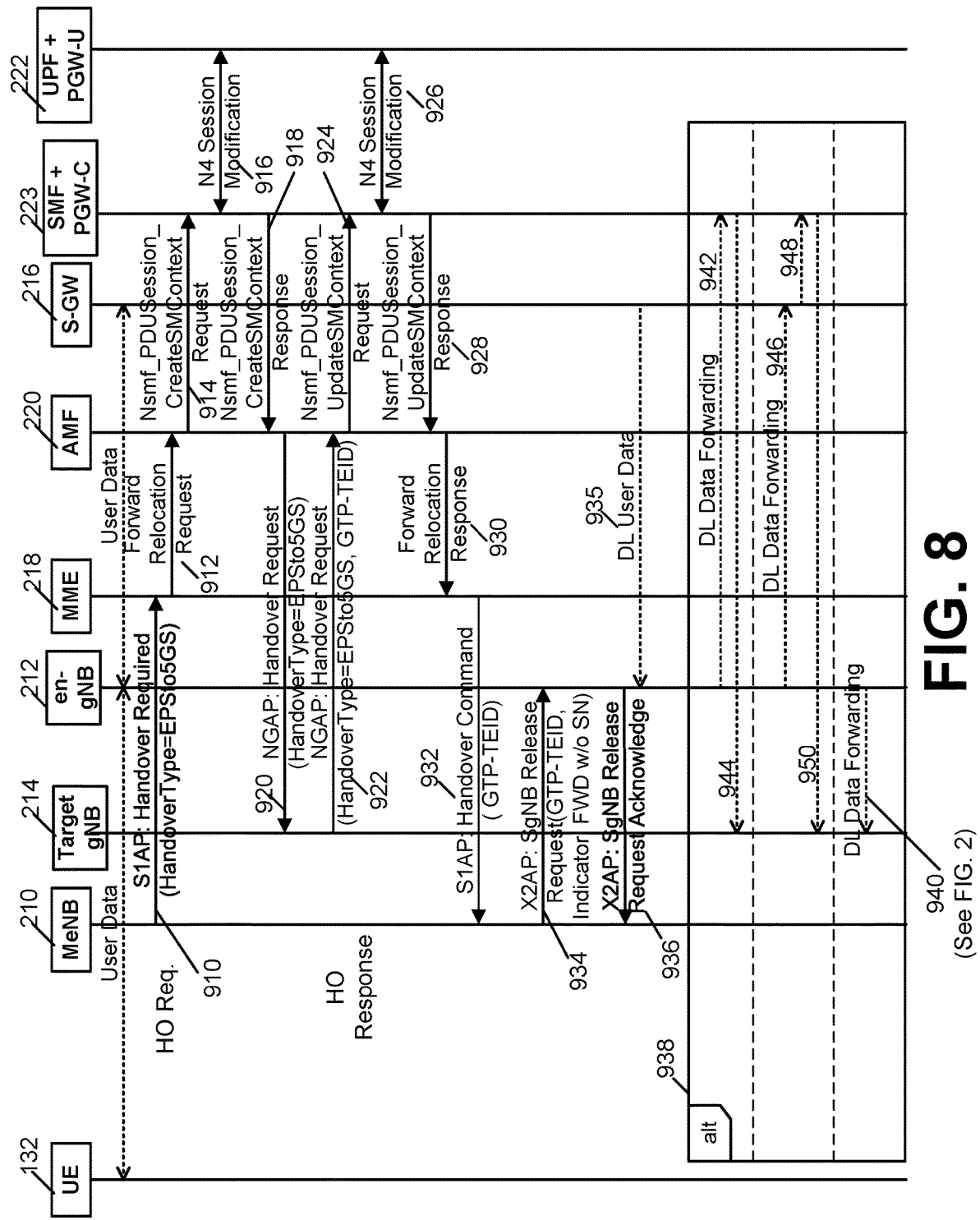
FIG. 8 is a diagram illustrating example data forwarding without sequence numbers based on a forward without sequence numbers indication received via a release request, according to one or more of FIGS. 2-7.

FIG. 8 is a diagram illustrating data forwarding without sequence numbers based on a forward without sequence numbers indication received via a release request, according to one or more of FIGS. 2-7. A UE 132 may have a connection with a MeNB 210, and another connection with a secondary gNB (or en-gNB) 212, as part of dual connectivity for the UE 132. MeNB 210 may send a handover request to target gNB 214 (to prepare the target gNB for a handover of the UE 132), via messages 910, 912, 914, 916, 918, and 920 (wherein the handover request is sent to target gNB 214 via messages sent to or forwarded via MME 218 and one or more network nodes of the core network, such as via nodes 220, 223 and 222). The target gNB 214 may reply with a handover response by sending message 922, including a tunnel identifier (e.g., GTP-TEID) to be used for data forwarding, which may be associated with the target gNB 214 or associated with a core network node along a data forwarding path from the secondary gNB 212 to the target gNB 212. The handover response is forwarded to MeNB 210 via messages 924, 926, 928, 930 and arrives as message 932 at the MeNB 210, including the tunnel identifier to be used for data forwarding.

As shown in FIG. 8, in order to release the secondary gNB 212 from its connection with UE 132 and cause a forwarding of data from the secondary gNB 212 to (or towards) the target gNB 214, the MeNB 210 sends a SgNB release request 934 to the secondary gNB 212, including the tunnel identifier (GTP-TEID) to be used for data forwarding, and a forward without sequence numbers indication ("FWD w/o SN"). The secondary gNB 212 may reply with a SgNB release request 936. Any DL data directed to the UE 132, e.g., which may be received at 935 by the secondary gNB 212, for example, may be forwarded by the secondary gNB 212 towards the target gNB, based on the tunnel identifier (or other address) provided to the secondary gNB in the SgNB release request 934.

As shown in FIG. 8, at 938, a few of many possible data forwarding paths are shown, for the secondary node (SgNB 212) to forward data without sequence numbers to the target gNB 214, e.g., depending on a configuration of a data forwarding path (via one or more tunnels that may be established based on the control signals), such as based on the tunnel configuration and/or based on the tunnel identifier provided to the secondary gNB 212 for data forwarding. For example, if the tunnel identifier is associated with (or is an address for or identifies) the target gNB 214, then the secondary gNB 212 may forward the data to target gNB 214 (940), which is same or similar to the forwarding path from SgNB 212 to target gNB 214 shown in FIG. 2. Also, as an example, the tunnel identifier may be associated with (or provided an address for) the SMF 223, and in such case, the secondary gNB 212 may forward the data towards the target gNB via the SMF 223 (942), which is then forwarded to target gNB 214 (944). Likewise, as another option (or possible data forwarding path), the secondary gNB 212 may forward the data to the target gNB 214 via S-GW 2316 and SMF 223 (see 946, 948 and 950). Thus, in this manner, for example, the secondary node (e.g., SgNB 212) may forward the data towards (or to) the target node (e.g., target gNB 214), via a forwarding path that omits the master node (e.g., MeNB 210). Other aspects of the handover (not shown) may then be performed, e.g., including the UE 132 establishing a connection, such as via random access (RACH) procedure, to the target node (target gNB 214). The UE 132 may then send UL data to and may receive DL data from the target gNB 214.

Example 1. A method comprising: sending, by a master node of a first radio access technology (RAT) that is operating as a master node for an inter-radio access technology (inter-RAT) dual connectivity connection with a user device, a handover request to a target node of a second RAT to request a handover of the connection with the user device from the master node of the first RAT to the target node of the second RAT, wherein the second RAT is different than the first RAT; receiving, by the master node of the first RAT from the target node of the second RAT, a handover response; and sending, by the master node of the first RAT to a secondary node of a third RAT that is operating as a secondary node for the inter-RAT dual connectivity connection with the user device, a release request, including a forward without sequence number indication to instruct the secondary node of the third RAT to forward, without sequence numbers, data for the inter-RAT dual connectivity connection towards the target node of the second RAT.

Example 2. The method of Example 1: wherein the first radio access technology (RAT), the second RAT, and the third RAT are all different RATs.

Example 3. The method of Example 1: wherein the first radio access technology (RAT) is different than the second RAT and the third RAT; and wherein the second RAT and the third RAT are the same RAT.

Example 4. The method of Example 1: wherein the first radio access technology (RAT) comprises LTE; wherein the second radio access technology (RAT) and the third radio access technology (RAT) comprises New Radio (NR) or 5G.

Example 5. The method of any of Examples 1-4: wherein the sending a handover request comprises sending, by a master node of a first radio access technology (RAT) that is operating as a master node for an inter-radio access technology (inter-RAT) dual connectivity connection with a user device, a handover request to a target node of a second RAT to request a handover of the connection with the user device from the master node of the first RAT to the target node of the second RAT, wherein the second RAT is different than the first RAT; wherein the receiving comprises receiving, by the master node of the first RAT from the target node of the second RAT, a handover response including a tunnel endpoint identifier; and wherein the sending a release request includes sending, by the master node of the first RAT to a secondary node of a third RAT that is operating as a secondary node for the inter-RAT dual connectivity connection with the user device, a release request, including the tunnel endpoint identifier and a forward without sequence number indication to instruct the secondary node of the third RAT to forward, without sequence numbers, data for the inter-RAT dual connectivity connection towards the target node of the second RAT based on the tunnel endpoint identifier.

Example 6. The method of Example 5, wherein the tunnel endpoint identifier is either associated with the target node of the second RAT or associated with a core network node in a data forwarding path from the secondary node to the target node.

Example 7. The method of Example 1, wherein: the sending a handover request comprises sending, by a master eNB that is operating as a master node for an inter-radio access technology (inter-RAT) dual connectivity connection with a user device, a handover request to a target gNB to request a handover of the connection with the user device from the master eNB to the target gNB; the receiving comprises receiving, by the master eNB from the target gNB, a handover response including a tunnel endpoint identifier; and the sending a release request comprises sending, by the master eNB to a secondary gNB that is operating as a secondary node for the inter-RAT dual connectivity connection with the user device, a release request, including the tunnel endpoint identifier associated with the target gNB and a forward without sequence number indication to instruct the secondary gNB to forward, without sequence numbers, data for the dual connectivity connection to the target gNB based on the tunnel endpoint identifier.

Example 8. The method of Example 7, further comprising: receiving, by the master eNB from the secondary gNB, a release request acknowledge.

Example 9. The method of any of Examples 7-8, wherein the tunnel endpoint identifier comprises a GPRS Tunneling Protocol tunnel endpoint identifier (GTP-TEID) that is either associated with the target gNB or associated with a core network node in a data forwarding path from the secondary gNB to the target gNB.

Example 10. The method of any of Examples 7-9, wherein the secondary gNB comprises a gNB that is configured to operate as a secondary gNB for a LTE-New Radio (5G) dual connectivity connection with the user device.

Example 11. The method of any of Examples 7-10, wherein the secondary gNB comprises a LTE-New Radio gNB or a EUTRA-New Radio gNB (en-gNB) that is configured to operate as a secondary gNB for a LTE-New Radio (5G) dual connectivity connection with the user device.

Example 12. The method of any of Examples 7-11, wherein the release request comprises a secondary gNB (SgNB) release request, indicating a GPRS Tunneling Protocol tunnel endpoint identifier (GTP-TEID) that is either associated with the target gNB or associated with a core network node in a data forwarding path from the secondary gNB to the target gNB.

Example 13. An apparatus comprising means for performing the method of any of Examples 1-12.

Example 14. A non-transitory computer-readable storage medium comprising instructions stored thereon that, when executed by at least one processor, are configured to cause a computing system to perform the method of any of Examples 1-12.

Example 15. An apparatus comprising: at least one processor; and at least one memory including computer program code; the at least one memory and the computer program code configured to, with the at least one processor, cause the apparatus at least to perform the method of any of Examples 1-12.

Example 16. An apparatus comprising: at least one processor; and at least one memory including computer program code; the at least one memory and the computer program code configured to, with the at least one processor, cause the apparatus at least to: send, by a master eNB that is operating as a master node for an inter-radio access technology (inter-RAT) dual connectivity connection with a user device, a handover request to a target gNB to request a handover of the connection with the user device from the master eNB to the target gNB; receive, by the master eNB from the target gNB, a handover response including a tunnel endpoint identifier; and send, by the master eNB to a secondary gNB that is operating as a secondary node for the inter-RAT dual connectivity connection with the user device, a release request, including the tunnel endpoint identifier and a forward without sequence number indication to instruct the secondary gNB to forward, without sequence numbers, data for the dual connectivity connection to the target gNB based on the tunnel endpoint identifier, wherein the tunnel endpoint identifier is either associated with the target gNB or associated with a core network node in a data forwarding path from the secondary gNB to the target gNB.

Example 17. A method comprising: receiving, by a secondary node of a third radio access technology (RAT) that is operating as a secondary node for an inter-radio access technology (inter-RAT) dual connectivity connection with a user device from a master node of a first RAT that is operating as a master node for the inter-RAT dual connectivity connection with the user device, a release request including a forward without sequence number indication that instructs the secondary node of the third RAT to forward, without sequence numbers, data for the dual connectivity connection to a target node of a second RAT, wherein the second RAT is different than the first RAT; and forwarding, by the secondary node of the third RAT towards the target node of the second RAT, via a data forwarding path that omits the master node of the first RAT, data without sequence numbers to the target node.

Example 18. The method of Example 17, further comprising: removing, by the secondary node of the third RAT, sequence numbers from the data for the dual connectivity connection before forwarding the data towards the target node.

Example 19. The method of any of Examples 17-18: wherein the first radio access technology (RAT), the second RAT, and the third RAT are all different RATs.

Example 20. The method of any of Examples 17-18: wherein the first radio access technology (RAT) is different than the second RAT and the third RAT; and
    wherein the second RAT and the third RAT are the same RAT.

Example 21. The method of any of Examples 17-18: wherein the first radio access technology (RAT) comprises LTE; wherein the second radio access technology (RAT) and the third radio access technology (RAT) comprises New Radio (NR) or 5G.

Example 22. The method of any of Examples 17-21: wherein the receiving comprises receiving, by a secondary node of a third radio access technology (RAT) that is operating as a secondary node for an inter-radio access technology (inter-RAT) dual connectivity connection with a user device from a master node of a first RAT that is operating as a master node for the inter-RAT dual connectivity connection with the user device, a release request including a tunnel endpoint identifier and a forward without sequence number indication that instructs the secondary node of the third RAT to forward, without sequence numbers, data for the dual connectivity connection towards the target node of the second RAT based on the tunnel endpoint identifier, wherein the second RAT is different than the first RAT; and wherein the forwarding comprises forwarding, by the secondary node of the third RAT towards the target node of the second RAT, via a data forwarding path that omits the master node of the first RAT, data without sequence numbers to the target node based on the tunnel endpoint identifier, wherein the tunnel endpoint identifier is either associated with the target node of the second RAT or associated with a core network node in the data forwarding path from the secondary node to the target node.

Example 23. The method of any of Examples 17-22, wherein the tunnel endpoint identifier comprises a GPRS Tunneling Protocol tunnel endpoint identifier (GTP-TEID) that is either associated with the target node of the second RAT or associated with a core network node in a data forwarding path from the secondary node to the target node.

Example 24. The method of any of Examples 17-23: wherein the receiving comprises receiving, by a secondary gNB that is operating as a secondary node for an inter-radio access technology (inter-RAT) dual connectivity connection with a user device from a master eNB that is operating as a master node for the inter-RAT dual connectivity connection with the user device, a release request, including a tunnel endpoint identifier and a forward without sequence number indication that instructs the secondary gNB to forward, without sequence numbers, data for the dual connectivity connection to the target gNB based on the tunnel endpoint identifier; and wherein the forwarding comprises forwarding, by the secondary gNB towards the target gNB via a data forwarding path that omits the master eNB, data without sequence numbers to the target gNB based on the tunnel endpoint identifier.

Example 25. The method of Example 24, wherein the tunnel endpoint identifier is either associated with the target gNB or associated with a core network node in a data forwarding path from the secondary gNB to the target gNB.

Example 26. The method of any of Examples 24-25, wherein the forwarding is performed either directly to the target gNB, or via one or more core network nodes, while omitting the master eNB from the data forwarding path.

Example 27. The method of any of Examples 24-26, wherein the secondary gNB comprises a LTE-New Radio gNB or a EUTRA-New Radio gNB (en-gNB) that is configured to operate as a secondary gNB for a LTE-New Radio (5G) dual connectivity connection with the user device.

Example 28. An apparatus comprising means for performing the method of any of Examples 17-27.

Example 29. A non-transitory computer-readable storage medium comprising instructions stored thereon that, when executed by at least one processor, are configured to cause a computing system to perform the method of any of Examples 17-27.

Example 30. An apparatus comprising: at least one processor; and at least one memory including computer program code; the at least one memory and the computer program code configured to, with the at least one processor, cause the apparatus at least to perform the method of any of Example 17-27.

Example 31. An apparatus comprising: at least one processor; and at least one memory including computer program code; the at least one memory and the computer program code configured to, with the at least one processor, cause the apparatus at least to: receive, by a secondary gNB that is operating as a secondary node for an inter-radio access technology (inter-RAT) dual connectivity connection with a user device from a master eNB that is operating as a master node for the inter-RAT dual connectivity connection with the user device, a release request, including a tunnel endpoint identifier and a forward without sequence number indication that instructs the secondary gNB to forward, without sequence numbers, data for the dual connectivity connection towards the target gNB based on the tunnel endpoint identifier; and forward, by the secondary gNB to the target gNB via a forwarding path that omits the master eNB, data without sequence numbers towards the target eNB based on the tunnel endpoint identifier associated with the target gNB.

Figure 9:
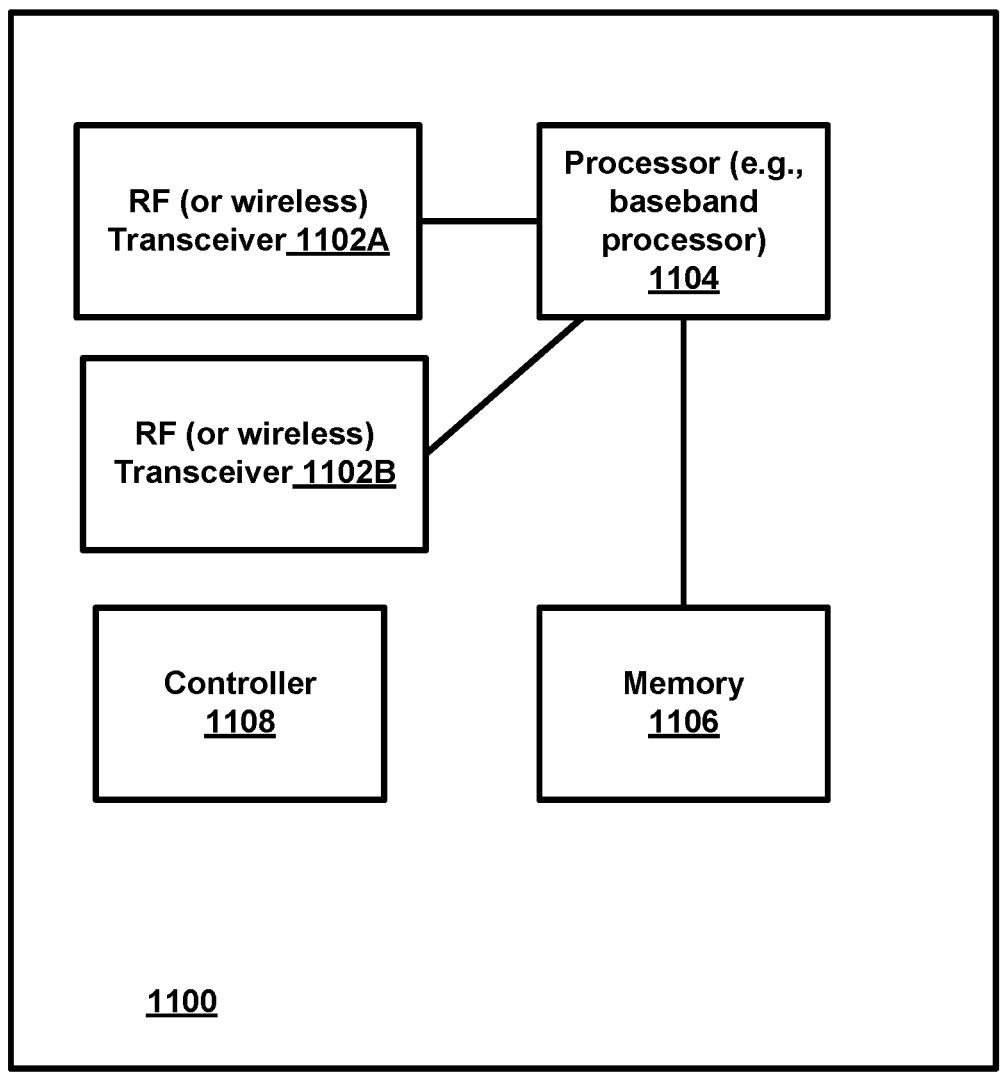
FIG. 9 is a block diagram of a wireless station or wireless node (e.g., AP, BS, gNB, RAN node, relay node, UE or user device, or other node) according to an example embodiment.

FIG. 9 is a block diagram of a wireless station or node (e.g., AP, BS, gNB, eNB, a relay node or other network node, or a user device/UE, or other node) 1100 according to an example embodiment. The wireless station 1100 may include, for example, one or more (e.g., two as shown in FIG. 9) RF (radio frequency) or wireless transceivers 1102A, 1102B, where each wireless transceiver includes a transmitter to transmit signals and a receiver to receive signals. The wireless station also includes a processor or control unit/entity (controller) 1104 to execute instructions or software and control transmission and receptions of signals, and a memory 1106 to store data and/or instructions.

Processor 1104 may also make decisions or determinations, generate frames, packets or messages for transmission, decode received frames or messages for further processing, and other tasks or functions described herein. Processor 1104, which may be a baseband processor, for example, may generate messages, packets, frames or other signals for transmission via wireless transceiver 1102 (1102A or 1102B). Processor 1104 may control transmission of signals or messages over a wireless network, and may control the reception of signals or messages, etc., via a wireless network (e.g., after being down-converted by wireless transceiver 1102, for example). Processor 1104 may be programmable and capable of executing software or other instructions stored in memory or on other computer media to perform the various tasks and functions described above, such as one or more of the tasks or methods described above. Processor 1104 may be (or may include), for example, hardware, programmable logic, a programmable processor that executes software or firmware, and/or any combination of these. Using other terminology, processor 1104 and transceiver 1102 together may be considered as a wireless transmitter/receiver system, for example.

In addition, referring to FIG. 9, a controller (or processor) 1108 may execute software and instructions, and may provide overall control for the station 1100, and may provide control for other systems not shown in FIG. 9, such as controlling input/output devices (e.g., display, keypad), and/ or may execute software for one or more applications that may be provided on wireless station 1100, such as, for example, an email program, audio/video applications, a word processor, a Voice over IP application, or other application or software.

In addition, a storage medium may be provided that includes stored instructions, which when executed by a controller or processor may result in the processor 1104, or other controller or processor, performing one or more of the functions or tasks described above.

According to another example embodiment, RF or wireless transceiver(s) 1102A/1102B may receive signals or data and/or transmit or send signals or data. Processor 1104 (and possibly transceivers 1102A/1102B) may control the RF or wireless transceiver 1102A or 1102B to receive, send, broadcast or transmit signals or data.

The example embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Example embodiments of the various techniques described herein may be implemented in digital electronic circuitry, or in computer hardware, firmware, software, or in combinations of them. Example embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, example embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Example embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   sending, by a master node of a first radio access technology (RAT) that is operating as a master node for an inter-radio access technology (inter-RAT) dual connectivity connection with a user device, a handover request to a target node of a second RAT to request a handover of the connection with the user device from the master node of the first RAT to the target node of the second RAT, wherein the second RAT is different than the first RAT;
   receiving, by the master node of the first RAT from the target node of the second RAT, a handover response;
   wherein the receiving comprises receiving, by the master node of the first RAT from the target node of the second RAT, a handover response including a tunnel endpoint identifier; and
   sending, by the master node of the first RAT to a secondary node of a third RAT that is operating as a secondary node for the inter-RAT dual connectivity connection with the user device, a release request, including a forward without sequence number indication to instruct the secondary node of the third RAT to forward, without sequence numbers, data for the inter-RAT dual connectivity connection towards the target node of the second RAT;
   wherein the sending a release request includes sending, by the master node of the first RAT to a secondary node of a third RAT that is operating as a secondary node for the inter-RAT dual connectivity connection with the user device, a release request, including the tunnel endpoint identifier and a forward without sequence number indication to instruct the secondary node of the third RAT to forward, without sequence numbers, data for the inter-RAT dual connectivity connection towards the target node of the second RAT based on the tunnel endpoint identifier.

2. The method of claim 1:
   wherein the first radio access technology (RAT), the second RAT, and the third RAT are all different RATs.

3. The method of claim 1:
   wherein the first radio access technology (RAT) is different than the second RAT and the third RAT; and
   wherein the second RAT and the third RAT are the same RAT.

4. The method of claim 1:
   wherein the first radio access technology (RAT) comprises LTE;
   wherein the second radio access technology (RAT) and the third radio access technology (RAT) comprises New Radio (NR) or 5G.

5. The method of claim 1, wherein the tunnel endpoint identifier is either associated with the target node of the second RAT or associated with a core network node in a data forwarding path from the secondary node to the target node.

6. The method of claim 1, wherein:
   the sending a handover request comprises sending, by a master eNB that is operating as a master node for an inter-radio access technology (inter-RAT) dual connectivity connection with a user device, a handover request to a target gNB to request a handover of the connection with the user device from the master eNB to the target gNB;
   the receiving comprises receiving, by the master eNB from the target gNB, a handover response including a tunnel endpoint identifier; and
   the sending a release request comprises sending, by the master eNB to a secondary gNB that is operating as a secondary node for the inter-RAT dual connectivity connection with the user device, a release request, including the tunnel endpoint identifier associated with the target gNB and a forward without sequence number indication to instruct the secondary gNB to forward, without sequence numbers, data for the dual connectivity connection to the target gNB based on the tunnel endpoint identifier.

7. The method of claim 6, further comprising:
   receiving, by the master eNB from the secondary gNB, a release request acknowledge.

8. The method of claim 6, wherein the tunnel endpoint identifier comprises a GPRS Tunneling Protocol tunnel endpoint identifier (GTP-TEID) that is either associated with the target gNB or associated with a core network node in a data forwarding path from the secondary gNB to the target gNB.

9. The method of claim 6, wherein the secondary gNB comprises a gNB that is configured to operate as a secondary gNB for a LTE-New Radio (5G) dual connectivity connection with the user device.

10. The method of claim 6, wherein the secondary gNB comprises a LTE-New Radio gNB or a EUTRA-New Radio gNB (en-gNB) that is configured to operate as a secondary gNB for a LTE-New Radio (5G) dual connectivity connection with the user device.

11. The method of claim 6, wherein the release request comprises a secondary gNB (SgNB) release request, indicating a GPRS Tunneling Protocol tunnel endpoint identifier (GTP-TEID) that is either associated with the target gNB or associated with a core network node in a data forwarding path from the secondary gNB to the target gNB.

12. A non-transitory computer-readable storage medium comprising instructions stored thereon that, when executed by at least one processor, are configured to cause a computing system to perform the method of claim 1.

13. An apparatus comprising:
at least one processor; and
at least one memory including computer program code;
the at least one memory and the computer program code configured to, with the at least one processor, cause the apparatus at least to:
send, by a master node of a first radio access technology (RAT) that is operating as a master node for an inter-radio access technology (inter-RAT) dual connectivity connection with a user device, a handover request to a target node of a second RAT to request a handover of the connection with the user device from the master node of the first RAT to the target node of the second RAT, wherein the second RAT is different than the first RAT;
receive, by the master node of the first RAT from the target node of the second RAT, a handover response;
wherein the apparatus caused to receive comprises the apparatus caused to receive, by the master node of the first RAT from the target node of the second RAT, a handover response including a tunnel endpoint identifier; and
send, by the master node of the first RAT to a secondary node of a third RAT that is operating as a secondary node for the inter-RAT dual connectivity connection with the user device, a release request, including a forward without sequence number indication to instruct the secondary node of the third RAT to forward, without sequence numbers, data for the inter-RAT dual connectivity connection towards the target node of the second RAT;
wherein the apparatus caused to send a release request comprises the apparatus caused to send, by the master node of the first RAT to a secondary node of a third RAT that is operating as a secondary node for the inter-RAT dual connectivity connection with the user device, a release request, including the tunnel endpoint identifier and a forward without sequence number indication to instruct the secondary node of the third RAT to forward, without sequence numbers, data for the inter-RAT dual connectivity connection towards the target node of the second RAT based on the tunnel endpoint identifier.

14. A method comprising:
receiving, by a secondary node of a third radio access technology (RAT) that is operating as a secondary node for an inter-radio access technology (inter-RAT) dual connectivity connection with a user device from a master node of a first RAT that is operating as a master node for the inter-RAT dual connectivity connection with the user device, a release request including a forward without sequence number indication that instructs the secondary node of the third RAT to forward, without sequence numbers, data for the dual connectivity connection to a target node of a second RAT, wherein the second RAT is different than the first RAT;
wherein the receiving comprises receiving, by a secondary node of a third radio access technology (RAT) that is operating as a secondary node for an inter-radio access technology (inter-RAT) dual connectivity connection with a user device from a master node of a first RAT that is operating as a master node for the inter-RAT dual connectivity connection with the user device, a release request including a tunnel endpoint identifier and a forward without sequence number indication that instructs the secondary node of the third RAT to forward, without sequence numbers, data for the dual connectivity connection towards the target node of the second RAT based on the tunnel endpoint identifier, wherein the second RAT is different than the first RAT; and
forwarding, by the secondary node of the third RAT towards the target node of the second RAT, via a data forwarding path that omits the master node of the first RAT, data without sequence numbers to the target node;
wherein the forwarding comprises forwarding, by the secondary node of the third RAT towards the target node of the second RAT, via a data forwarding path that omits the master node of the first RAT, data without sequence numbers to the target node based on the tunnel endpoint identifier, wherein the tunnel endpoint identifier is either associated with the target node of the second RAT or associated with a core network node in the data forwarding path from the secondary node to the target node.

15. The method of claim 14, further comprising:
removing, by the secondary node of the third RAT, sequence numbers from the data for the dual connectivity connection before forwarding the data towards the target node.

16. The method of claim 14:
wherein the first radio access technology (RAT), the second RAT, and the third RAT are all different RATs.

17. The method of claim 14:
wherein the first radio access technology (RAT) is different than the second RAT and the third RAT; and
wherein the second RAT and the third RAT are the same RAT.

18. The method of claim 14:
wherein the first radio access technology (RAT) comprises LTE;
wherein the second radio access technology (RAT) and the third radio access technology (RAT) comprises New Radio (NR) or 5G.

19. The method of claim 14, wherein the tunnel endpoint identifier comprises a GPRS Tunneling Protocol tunnel endpoint identifier (GTP-TEID) that is either associated with the target node of the second RAT or associated with a core network node in a data forwarding path from the secondary node to the target node.

20. The method of claim 14:
wherein the receiving comprises receiving, by a secondary gNB that is operating as a secondary node for an inter-radio access technology (inter-RAT) dual connectivity connection with a user device from a master eNB that is operating as a master node for the inter-RAT dual connectivity connection with the user device, a release request, including a tunnel endpoint identifier and a forward without sequence number indication that instructs the secondary gNB to forward, without sequence numbers, data for the dual connectivity connection to the target gNB based on the tunnel endpoint identifier; and
wherein the forwarding comprises forwarding, by the secondary gNB towards the target gNB via a data forwarding path that omits the master eNB, data without sequence numbers to the target gNB based on the tunnel endpoint identifier.

21. The method of claim 20, wherein the tunnel endpoint identifier is either associated with the target gNB or associated with a core network node in a data forwarding path from the secondary gNB to the target gNB.

22. The method of claim 20, wherein the forwarding is performed either directly to the target gNB, or via one or more core network nodes, while omitting the master eNB from the data forwarding path.

23. The method of claim 20, wherein the secondary gNB comprises a LTE-New Radio gNB or a EUTRA-New Radio gNB (en-gNB) that is configured to operate as a secondary gNB for a LTE-New Radio (5G) dual connectivity connection with the user device.

24. A non-transitory computer-readable storage medium comprising instructions stored thereon that, when executed by at least one processor, are configured to cause a computing system to perform the method of claim 14.

25. An apparatus comprising:
   at least one processor; and
   at least one memory including computer program code;
   the at least one memory and the computer program code configured to, with the at least one processor, cause the apparatus at least to perform the method of claim 14.

* * * * *